Dec. 20, 1955 W. VON STOESER 2,727,743
BALL BUMPER

Filed Jan. 24, 1949 4 Sheets-Sheet 1

Inventor:
Walter Von Stoeser
By [signature]
Attorney

Dec. 20, 1955   W. VON STOESER   2,727,743
BALL BUMPER
Filed Jan. 24, 1949   4 Sheets-Sheet 2
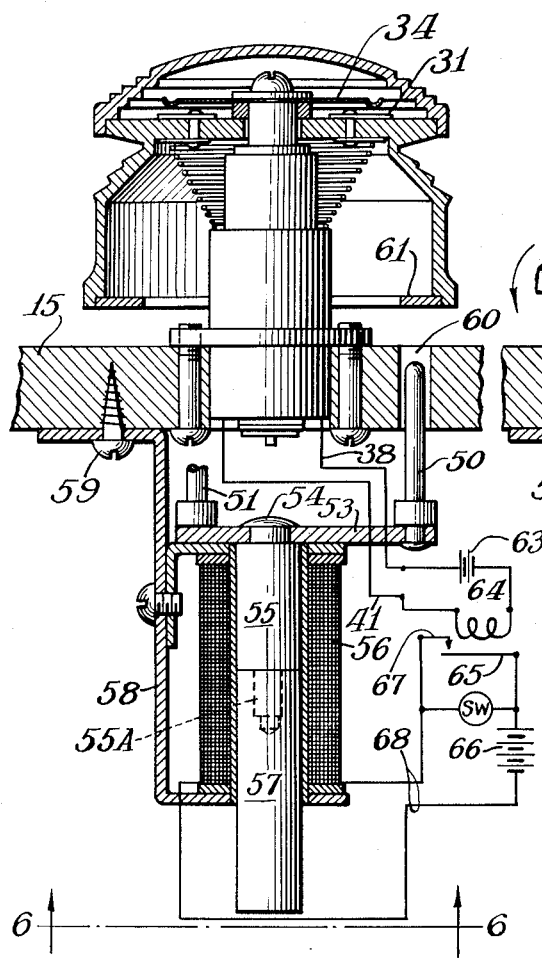
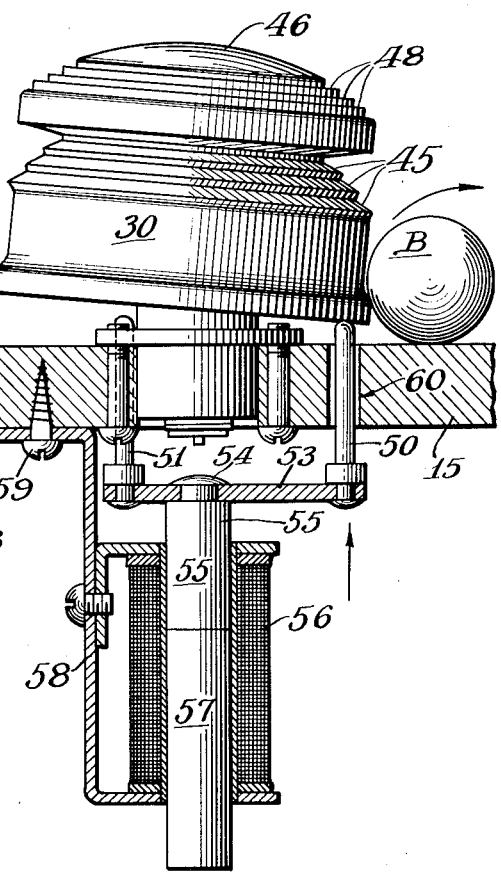
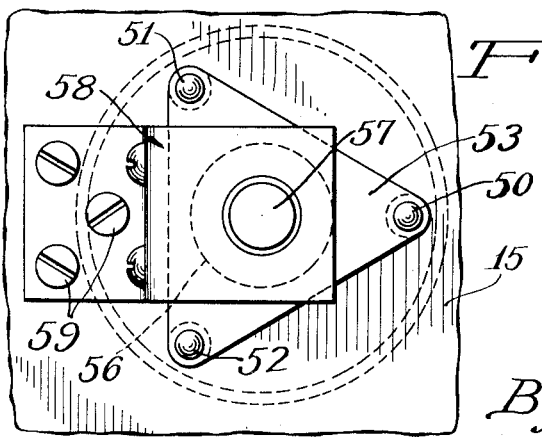
Inventor:
Walter Von Stoeser
By (signature)
Attorney Dec. 20, 1955 W. VON STOESER 2,727,743
BALL BUMPER
Filed Jan. 24, 1949 4 Sheets-Sheet 3
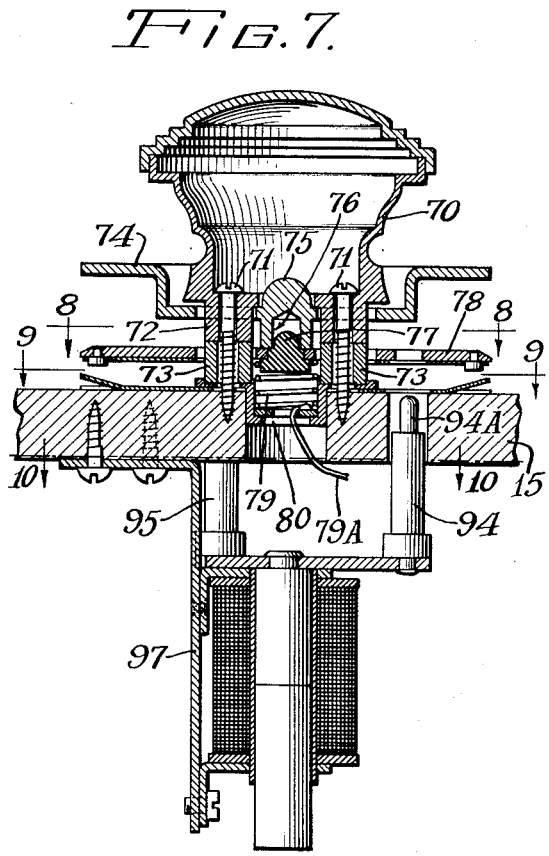
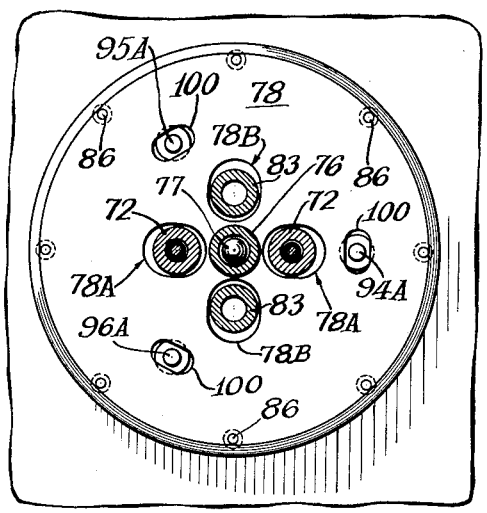
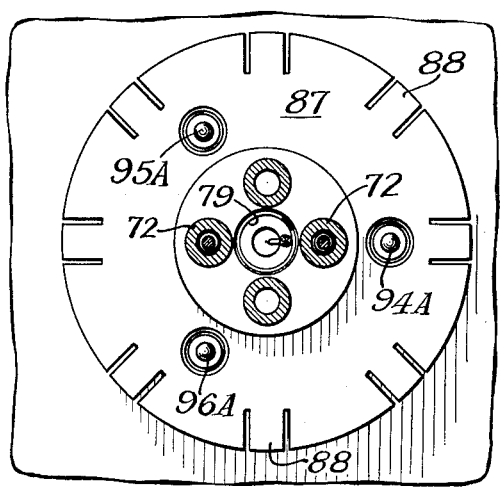
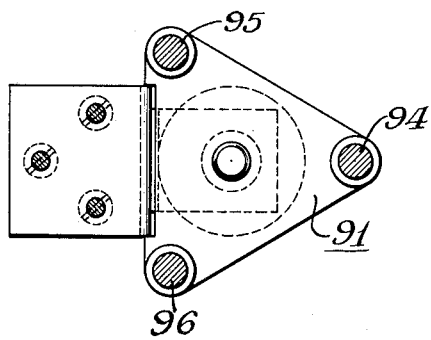
Inventor:
Walter Von Stoeser
By *Carrol Livingston*
Attorney Dec. 20, 1955  W. VON STOESER  2,727,743
BALL BUMPER
Filed Jan. 24, 1949  4 Sheets-Sheet 4
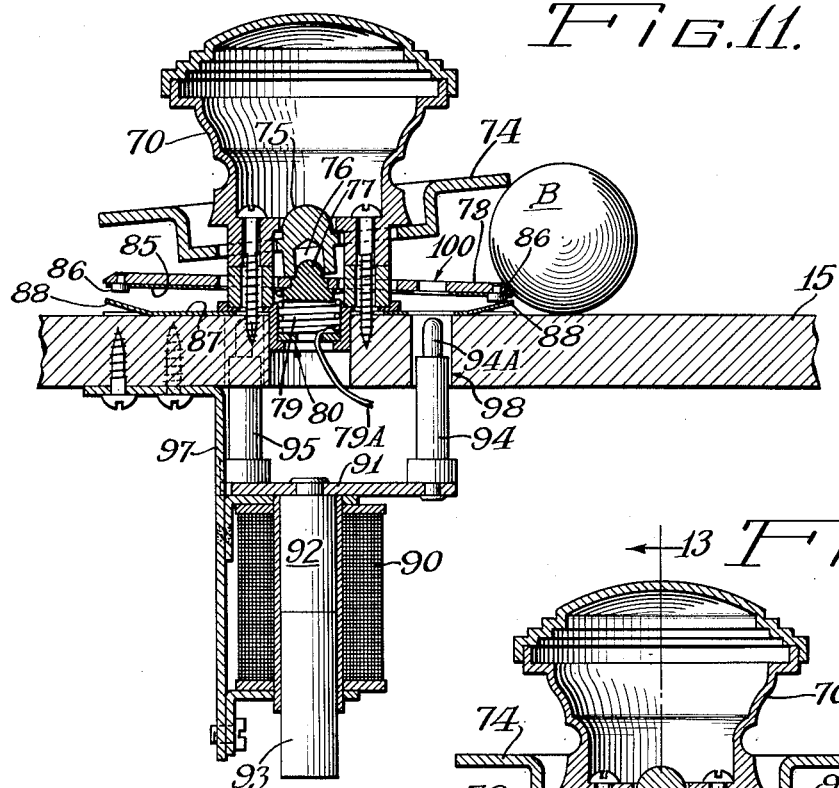
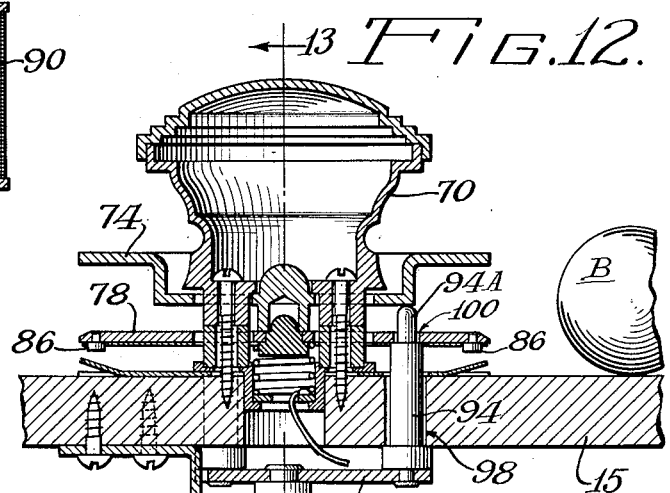
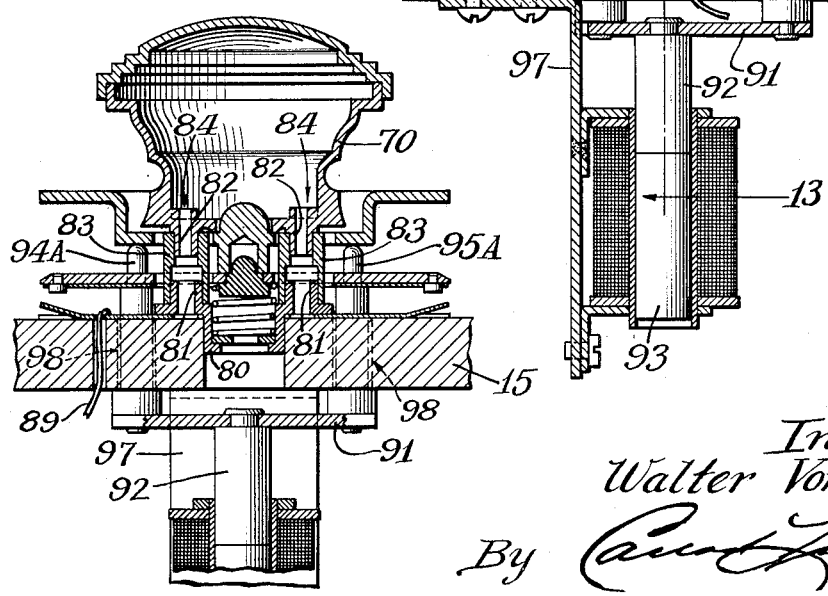
Inventor:
Walter Von Stoeser
By
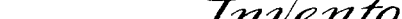
Attorney

United States Patent Office 2,727,743
Patented Dec. 20, 1955

2,727,743

BALL BUMPER

Walter Von Stoeser, Chicago, Ill., assignor to Raymond T. Moloney, Chicago, Ill.

Application January 24, 1949, Serial No. 72,371

11 Claims. (Cl. 273—118)

This invention has as its principal object the provision of improvements in ball bumpers or targets for use in ball rolling games and the like.

More particular objects include the provision of a bumper of the class described having a lamp housing of molded translucent material; the provision of a spring mounting for a rockable dome portion to house certain instrumentalities; the provision of a translucent post for said dome portion and which houses an electric light adapted to illuminate the dome portion; the provision of an overhead switch contact means in said dome portion; and the provision of electromagnetic reprojecting mechanism for deflecting a ball striking the bumper and imparting a new playing trajectory to the ball, said mechanism being of a nature, and located in such a manner, as not to interfere with the luminescent effects produced by the light in the bumper.

It is also an object to provide a ball bumper adapted to rock from a normal upright position when struck by a ball and electromagnetic mechanism including vertically reciprocable fingers rising together from beneath the bumper to restore the same abruptly to normal position with sufficient force to reproject the ball therefrom.

Another important object is the provision of horizontally parallel wafers members in a bumper of the class described and adapted to be wedged apart for the purpose of actuating a ball switch means cooperable with one of said wafer members; and a still further object is the provision of jointly rising restoring fingers driven electromagnetically up beneath the lowermost said wafer member to effect a reprojection of the ball when the switch means is actuated thereby as aforesaid.

Additional objects and aspects of novelty reside in the details of construction and operation of the preferred embodiments hereinafter described in view of the annexed drawings, in which:

Fig. 4 is a cross-sectional view of a bumper similar to that of Fig. 3 but modified to include the electromagnetic reprojecting mechanism;

Fig. 5 is a vertical elevational view of the bumper in ball-rocked position preliminary to ball-reprojecting reaction, and having parts of the electromagnetic reprojecting means shown in section;

Fig. 6 is a bottom plan view of the bumper-restoring or reprojecting means looking in the direction of line 6—6 of Fig. 4;

Fig. 7 is a vertical section through a modified form of bumper utilizing the divergent wafers and cooperating switch means;

Fig. 8 is a horizontal section taken along line 8—8 of Fig. 7 and showing the lower wafer member in plan;

Fig. 9 is a horizontal section along line 9—9 of Fig. 7 and showing the lower contact disc in plan;

Fig. 10 is a horizontal section along line 10—10 of Fig. 7 showing the restoring-finger array;

Fig. 11 is a sectional view similar to that of Fig. 7 with the wafer members ball-diverged;

Fig. 12 is a sectional view similar to Fig. 11 with the wafers restored to reproject a ball;

Fig. 13 is a fragmentary sectional view similar to the showing of Fig. 12 but showing two of the three restoring fingers elevated as seen in the direction of line 13—13 of Fig. 12.

Figure 1:
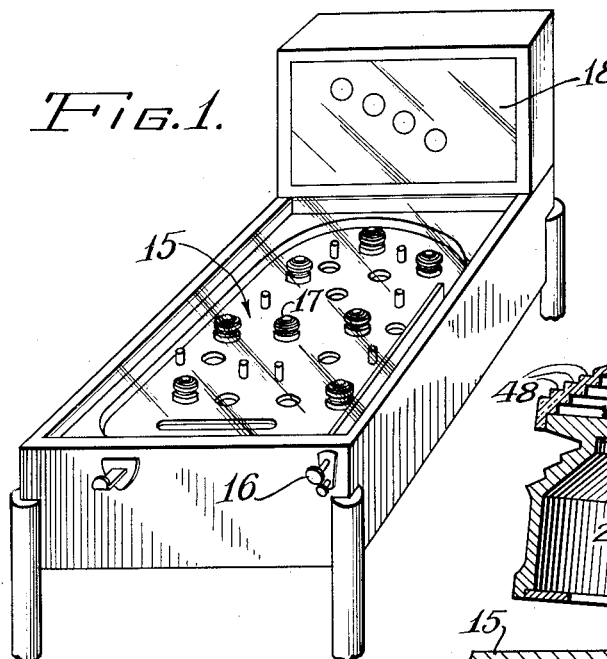
Fig. 1 is a fragmentary perspective of a ball rolling game of the type in which the improved bumper is particularly intended to be used.

The novel bumpers are intended to be used in the type of ball game depicted in Fig. 1 and which includes the usual ball playing field or board 15 upon which a ball may be projected by manipulation of plunger 16 to cause the ball to course over the field and engage the targets or bumpers 17, some or all of which may be of the construction herein disclosed, and some or all of which may have switch means actuated upon proper engagement by the ball to actuate any desired scoring mechanism (not shown) to illuminate score lights in the back box 18, for example.

Figure 2:
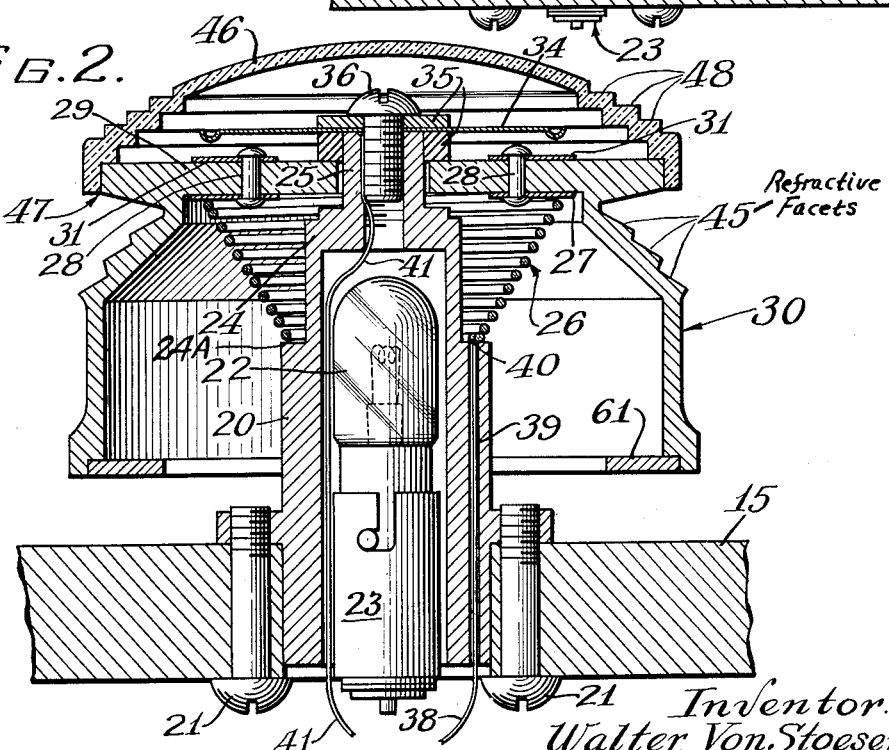
Fig. 2 is an enlarged, vertical, cross-sectional view of the bumper having lenticular formations with the overhead switch means.

In accordance with the construction of Fig. 2, the bumper includes a translucent plastic post 20 seated at its lower end in an opening in the board 15 and retained therein by screws 21, there being in the post a bore in which is disposed lamp 22 seated in socket 23 secured to the underside of the board 15.

At the upper part of the post are two reduced portions 24 and 25; adjoining portion 24 is ledge 24A upon which rests the lower, narrower convolutions of a conical spring 26, the upper and wider terminus of which bears up against a contact ring 27 secured by rivets 28 to the underside of the top 29 of the bumper shell 30, there being a companion contact ring 31 on the upper face of said top and connected electrically with the lower ring by the retaining rivets 28.

Figure 3:
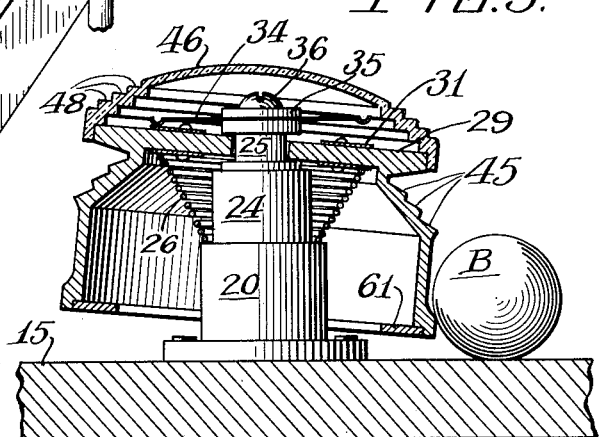
Fig. 3 is a cross-sectional view similar to that of Fig. 2, but to smaller scale and showing the bumper rocked by a ball.

Thus, the bumper shell 30 is resiliently disposed in a normally upright condition on spring 26, and its top 29 has a central bore which is sufficiently wider than the upper reduced post portion 25 to permit said shell to rock relative to the post, as when struck by a ball B, as depicted in Fig. 3, there being an upper contact wafer 34 secured on the top of the main post between collars 35 by screw 36.

The control-circuit connections from bumper-switch means 31, 34 are made through lead wire 38, entering the bottom of the post and passing upwardly through a bore 39 to connect with the spring 26 as at 40, the circuit passing through spring 26, lower ring 27, rivet 28, and upper ring 31, thence through the contact disc 34 (in the condition of Fig. 3), and back through a rattail lead 41 (Fig. 2) from screw 36 down through the bore of the post.

Any kind of control circuit may be employed for cooperation with switch means 31, 34, there being a great variety known and commonly used in the art; for example, this switch means may control directly or through relay means the illumination or extinguishing of the lamp 22, alone or in combination with any well-known score register circuit.

Attention is directed to the enlarged sectional view of Fig. 2, and to the provision therein of refracting facets or faces 45 on the upper head portions of the shell 30. The dome 46 of the bumper is preferably a separable cap member having a force fit with the top 29 of the shell, as at 47, Fig. 2, and the dome piece is preferably molded from a suitably translucent plastic with refracting facets 48 provided therein. The refracting formations 45 and 48 are also shown to advantage in Fig. 5.

The novel reprojecting means as illustrated particularly in Fig. 4, includes a plurality, preferably three, of vertically reciprocable fingers 50, 51, 52 fixed at the corners of a triangular plate 53 (Fig. 6 also), which in turn is secured by headed means 54 to the upper end of a plunger 55 movable up and down in the bore of an electromagnetic solenoid 56. Also movable up and down in said bore of the solenoid is a core plug 57 which is magnetically attractable, while the plunger 55 is not, and the plug 57 is normally disposed by gravity in the lowered condition of Fig. 4.

Bracket means 58, secured to the underside of the board 15 as by screws 59, positions the finger means operatively relative to the bumper, the fingers 50, 51, 52 passing upwardly through holes 60 in the playfield 15 to engage the underside of an impact ring 61 (Figs. 2 and 4) force-fitted into the skirt of shell 30 when the solenoid is energized, as in Fig. 5, whereby plug 57 is attracted upwardly against plunger 55 to elevate the latter and its finger-carrying plate 53.

Since the restoring fingers 50, 51, 52 are disposed equidistantly from one another and at radial points about the rocking axis of the shell 30, the latter will be restored to normal upright position by one of the fingers no matter from what direction the striking ball approaches.

In order to effect automatic reprojection of a striking ball, such as ball B of Fig. 3, or Fig. 5, the switch means 31, 34 is to be connected in an energizing circuit for the solenoid as shown in Fig. 4, wherein switch contacts 31 and 34 are connected by their respective leads 38 and 41 in series with battery 63 and relay coil 64, so that when contacts 31 and 34 are ball-closed, relay coil 64 attracts its armature contact 65, completing a circuit through power source 66 from contact 67 to energize solenoid coil 56 via conductors 68, thus causing elevation of the restoring fingers 50, 51, 52 in the manner heretofore described.

It will be apparent from Fig. 5 that the finger 50, for example, will rock the bumper back toward its normal position, and that such movement will tend to throw the ball B away from the skirt of the shell in the direction of the arrow, and the side of the bumper opposite from the ball will tend to return to normal position in the downward direction indicated by the appropriate arrow.

*Modified construction*

In the form of the bumper shown in Fig. 7, the shell 70 of the bumper housing remains stationary, being mounted by screws 71 through its base studs 72 and collars 73, on board 15.

An upper wafer member 74 of molded plastic has a dished portion in the center of which is a spherical boss 75 projecting rockably up through a central hole in the bottom of the shell 70, and said boss also has a pendant tubular portion 76 into which projects a similar but smaller boss 77 on a bottom wafer 78.

Said smaller boss 77 has a pendant stud on the underside of its wafer 78 which fits into a normalizing spring 79 seated in a molded plastic insert 80 fitted into a bore in board 15.

As seen in Fig. 8, the lower disc or wafer 78 has oversize holes 78A for the stud and collar portions 72 and 73 to permit rocking of the wafer; and the dished part of the companion wafer has similarly enlarged passage holes.

Referring to Fig. 13, it will be noted at the lower part of the assembly that the insert 80 in the board has a pair of studs 81 aligned with similar depending studs 82 on the shell, and each of these respective pairs of studs 81—82 are joined by a fitted plastic sleeve 83, there being a bore, as at 84, through each of the aligned pairs to provide passage for electrical conductors leading from a lamp (not shown) inside the shell. In order to permit rocking of the wafers, both the upper and lower wafers have enlarged holes like the holes 78B, Fig. 8 for sleeves 83.

It will appear from Fig. 7 that the spring 79 tends to center the lower wafer 78 in a normally horizontal plane, and since the upper wafer means is centered by its depending stud 76 on the smaller spherical boss 77 of the lower wafer, the upper wafer is likewise normalized or centered in a horizontal plane; however, said wafers may rock in opposite directions relative to each other in the manner illustrated in Fig. 11, the spherical shape of the lower and smaller boss 77 permitting this motion, while the larger, upper boss 75 similarly permits rocking of the upper wafer relative to the bottom of the shell 70.

The normal spacing between the upper and lower wafers is contrived to engage a particular size of ball B on opposite sides of its horizontal diameter, the ball actually engaging the wafers in this relation, so that a wedging action results to rock the upper wafer upward and the lower wafer downward, as depicted in Fig. 11.

The switch means of the modified wafer bumper consists in the provision on the underside of the lower wafer of a metal disc 85 secured thereto by contact inserts 86 situated equidistantly about the periphery of the wafer; spring 79 bearing up against this metal disc affords a movable connection thereto, a rattail 79A (Fig. 11) connecting this spring in a desired circuit.

Another contact disc 87, shaped as in Fig. 9, with yieldable contact tabs 88 corresponding in spacing to the contacts 86, is held on the board by the insert 80, a lead wire 89, Fig. 13, being connected to said lower disc and passed through the board for connection in the desired control circuit with its companion lead 79A.

Thus, in Fig. 11, the ball B having wedged the lower wafer 78 downwardly with the proximate contact button 86 engaged with the corresponding disc tab 88, a circuit is completed for the desired purpose, for example the operation of reprojecting means now to be described.

The modified bumper structure may employ the same restoring or reprojecting means heretofore described; and to this end, there is provided a solenoid coil 90 having a triangular plate 91 on plunger 92 in its bore. Restoring fingers 94, 95, and 96 are disposed at the corners of the plate in the array shown in Fig. 10, and the solenoid assembly is positioned by bracket means 97 with fingers 94, 95, 96 projecting upwardly through holes 98 in board 15.

An important feature of the restoring means for the modified wafer bumper is the fact that each finger has a reduced projection 94A, 95A, 96A at its upper end (Fig. 13 particularly), such that there is a shoulder formed at the base of each said reduced projection; and the wafer 78, as shown in Figs. 8, 12 and 13 is provided with three corresponding holes 100 of oblate shape and disposed in register with the several reduced projections 94A, 95A, 96A such that said projections may rise through the corresponding holes 100 to engage the underside of the dished part of the upper wafer 74 in the manner shown in Fig. 13 to restore said wafer to normal position and effect reprojecting action thereof; however, the oblate holes 100 are not wide enough to permit passage of the shoulder portions of fingers 94, 95, 96 at the root of said reduced projections, and accordingly the shoulder portions bear upwardly against the lower wafer 78 and also restore the latter to normal position with concurrent reprojecting action responsive to energization of the solenoid. This action results in a reverse wedging or expulsion of the ball from between the two wafers and gives a double application of reprojecting force.

The same kind of solenoid circuit as provided in Fig. 4 may be used in the arrangement of Fig. 7, which is to say that the bumper may be connected for automatic reprojection when struck by a ball; or, a manual switch SW, as shown in Fig. 4, may be used for effecting player control of the bumper, alone or as an adjunct to the bumper switch control.

The solenoid means 55, 56, 57 is of simplified construction adapted for vertical mounting so that gravity restores the plug and core assembly, the plug 55 being non-magnetic and extending only partially into the bore, so that the major body of the core 57 will rise into the bore upon energization; core 57 is preferably attached to the plug 55 by a fitted stud 55A (Fig. 4). This electromagnetic means may take other forms so long as the finger assembly is given a linear motion collaterally with the axis of the annular shell 30 or the annular members 74, 78.

Novel luminosity and refractive effects are procured when the shell 30 is made from a light-transmitting material having a suitable refractive index, such as the polystyrene plastics like the commercial product known under the proprietary trade-mark "Lucite," a sort of scintillation resulting when the shell is ball-rocked and the internal light source 22 is illuminated. In such an arrangement, the table mount or post 20 should have a thin wall and be made from a material having high transmission characteristics. The housing 70 of Fig. 13 may be similarly constructed as to the facets 45, 48, the post passages 84 (Fig. 13) being provided for lamp conductors; however, the same sparkling luminosity effects will not be apparent since housing 70 does not move, although some effect will be noted as the observer moves relative to the bumper, and the effect is therefore an improvement over prior forms. The inclusion of tinting color in the light source, post structure, or shell, enhances the luminescent effect.

The invention claimed is:

1. A bumper for ball games comprising a relatively stationary member and a rockable member mounted concentrically of the first member, spring means normalizing the rockable member with respect to the concentric axis of the first member and permitting the second member to rock responsive to impact of a ball therewith, and restoring means including three plungers spaced about said axis and reciprocable in parallelism with said axis to return said rockable member to normal position by movement against the same from a normally retracted position, together with mechanism for reciprocating said plungers.

2. A ball bumper including an annular member, means providing a fulcrum centrally of said member such that the latter may rock thereabout, spring means normalizing said annular member in a position of equilibrium relative to said fulcrum, said annular member including portions disposed radially about an axis concentric of said fulcrum and the center of said member, said portions being adapted to be struck by a ball to rock said member from normalized position, means including at least three circumferentially spaced fingers movable in the direction of said axis and engageable with said annular member at points radial of said axis for rocking said member back toward said normalized position, a second annular member and means mounting the same concentrically with said first-mentioned annular member to rock similarly to the latter and about an axis through the fulcrum of said first-mentioned annular member and concentric of both said annular members, the second said annular member being spaced axially below the first member and normalized by said spring means in approximate parallelism with the first annular member a distance such that a ball striking the first said annular member will also strike the second annular member and tend to wedge said members apart by rocking the same in opposite directions, the restorative action of said annular members urged by said spring means tending to expel and reproject said ball.

3. A rockable game device comprising a first mount, a coil spring carried at one end on said mount, a first annular member carried on the other end of said spring concentrically of the axis thereof, a second annular member rockably mounted on a central portion of said first annular member but spaced axially therefrom a distance to permit wedging entry of a ball therebetween, a second mount guidably engaging with a central member on said second annular member such that the latter may rock in all positions of rocking displacement of the first annular member, said first and second annular members being normally maintained by action of said spring in approximately parallel planes and having peripheral portions in approximate circumferential alignment and spaced relatively as aforesaid such that a spherical playing piece will engage said peripheral portions to wedge said annular members apart in opposite rocking motion and switch contact means for a control circuit and actuated by wedged rocking of one of said annular members.

4. A device in accordance with claim 3 and further characterized by the provision therein of a plurality of fingers and means mounting the same in equidistantly spaced circumferential relation in parallelism with said axis and for joint movement back and forth into and out of engagement with side portions of at least one of said annular members at points radial to said axis for movement of said annular member from a plane of rocked position into a plane of normal position and equilibrium, and electromagnetic actuating means for effecting back and forth motion of said finger-mounting means, said actuating means being connected in a circuit controlled by said switch contact means.

5. A game device comprising a solenoid, a plug extending partially into the bore of the solenoid for reciprocation therein, a core in said bore attracted by energization of the solenoid to move said plug in an advancing direction, said plug and core being normally urged into a retracted position opposite from said advancing direction, a plate carried at the outer end of said plug, at least three fingers mounted on said plate radially of the axis of said bore and in approximately circumferentially spaced relation to extend in parallelism with said axis, a coil spring mounted concentrically of said axis, an annular member carried at an end of said spring remote from said solenoid and maintained in a normal position of equilibrium thereby for rocking movement in a sense laterally of said axis when peripheral portions of the said annular member are struck by a playing piece, energization of said solenoid displacing said core and plug to urge said fingers against the proximate side of said annular member to rock the latter into normal position from rocked condition.

6. The device defined in claim 5 and further characterized by the provision of switch means actuated by rocking movement of said annular member from normal position and connected in an energizing circuit for said solenoid.

7. In a ball bumper, in combination, a pair of disc members, and supporting means therefor including a spring mounting said disc members normally in parallelism and for rocking motion relative to each other and a common axis through the centers thereof said disc members being spaced axially to permit wedging entry of a ball therebetween, and means including a plurality of fingers mounted to move jointly in parallelism with said axis at points about the axis toward the planes of said disc members, the said disc member nearest said fingers having passage holes aligned with the proximate ends of said fingers and through which the end portions of corresponding fingers pass into engagement with the remote one of said disc members, said fingers having shoulder portions spaced from said end portions thereof to engage marginal regions of said holes, whereby said disc members are simultaneously rocked into parallelism and normal position from rocked position to expel a wedging ball responsive to engagement of the finger ends and shoulder portions with corresponding disc member portions, as aforesaid.

8. A ball bumper comprising an upright support for mounting on a ball playing member; a bumper part centrally mounted to rock about an upper end portion of said support, spring means acting on said bumper part to maintain the same in an approximately level position relative to an upper surface of said ball playing member; said bumper part being spaced from said surface to be engaged and rocked by a ball thereon, and means for forcibly restoring said bumper part from ball-rocked position to approximately normal position to reproject a ball rocking the same, said means including restoring means movable up through said playing member to engage the ball-rocked bumper part at points spaced in a circumambient sense about said support and move said part toward normal position, whereby to propel the rocking ball therefrom, and electromagnetic actuating means mounted below said playing member and cooperable with said restoring means to move the same into restoring engagement with the bumper part as aforesaid.

9. A bumper structure according to claim 8 in which said bumper part comprises two members with means rockably mounting the same on said support in normally spaced relation vertically a distance sufficient to permit a ball to move wedgingly therebetween to rock the same in opposite directions, and said restoring means engages and acts upon both bumper-part members to move the same restoratively toward each other to propel a wedging ball therefrom as set forth.

10. A ball bumper including an annular member and supporting means providing a fulcrum therefor mounting the same above a ball rolling field for rocking movement above the surface of said field with peripheral portions of said annular member normally disposed in a plane approximately parallel to said surface and above the latter at a height to be engaged by a ball rolling on said surface, whereby said annular member may be rocked by a ball from said normal disposition, and electromagnetically operated mechanism mounted below the surface of said field and including at least three restoring members situated at equal radial distances and equidistantly apart about an axis concentric with said fulcrum and the center of said annular member and moved from a position normally below said surface by energization of said electromagnetically operated mechanism upwardly through said surface into engagement with radially situated parts of said annular member on the side of the latter proximate to said surface, the aforesaid motion of said restoring members being joint and in parallelism with said axis and acting to restore said annular member to said normal disposition and repel a ball in rocking engagement therewith.

11. A ball bumper comprising an upright support for mounting on a ball playing member; a bumper structure comprising two wafer-like bumper elements concentrically mounted in upper and lower positions to rock convergently and divergently relative to each other about an upper end portion of said support; spring means acting on said bumper elements to maintain the same in an approximately level normal position relative to each other and an upper playing surface of said ball playing member, said bumper elements being spaced from said surface to be engaged and wedgingly and divergently rocked by a ball thereon; adn means for forcibly restoring said bumper elements from ball-rocked position to approximately normal position to expel and reproject a ball rocking the same, said means including at least three restoring fingers mounted for movement jointly up through said playing member in spaced-apart circumferential sense about said support to engage both said lower and upper bumper elements and rock the same in a convergent sense back toward said normal position and thereby expel a wedging ball, as aforesaid; together with electromagnetic actuating means mounted below said playing member and cooperable with said restoring means to move said fingers and rock the bumper elements as aforesaid.

References Cited in the file of this patent

UNITED STATES PATENTS

| | | |
|---|---|---|
| 2,184,866 | Radtke | Dec. 26, 1939 |
| 2,184,868 | Williams et al. | Dec. 26, 1939 |
| 2,209,589 | Williams et al. | July 30, 1940 |
| 2,218,968 | Hooker | Oct. 22, 1940 |
| 2,222,096 | Williams et al. | Nov. 19, 1940 |
| 2,226,895 | Caestecker | Dec. 31, 1940 |
| 2,275,005 | Bevington | Mar. 3, 1942 |
| 2,277,274 | Stoner et al. | Mar. 24, 1942 |
| 2,322,091 | Hooker et al. | June 15, 1943 |
| 2,501,021 | Benak | Mar. 21, 1950 |